United States Patent
Arai et al.

(10) Patent No.: US 7,474,301 B2
(45) Date of Patent: Jan. 6, 2009

(54) DRIVING METHOD FOR DISPLAY APPARATUS

(75) Inventors: Michio Arai, Kanagawa (JP); Kenichi Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 186 days.

(21) Appl. No.: 10/515,355

(22) PCT Filed: May 28, 2003

(86) PCT No.: PCT/JP03/06657

§ 371 (c)(1),
(2), (4) Date: Aug. 22, 2005

(87) PCT Pub. No.: WO03/102684

PCT Pub. Date: Dec. 11, 2003

(65) Prior Publication Data

US 2006/0097982 A1    May 11, 2006

(30) Foreign Application Priority Data

May 31, 2002 (JP) ............................. 2002-159479
Apr. 3, 2003 (JP) ............................. 2003-100501

(51) Int. Cl.
    *G09G 5/00* (2006.01)
(52) U.S. Cl. ....................................... 345/204; 359/273
(58) Field of Classification Search ................. 345/204; 359/265, 153, 273
    See application file for complete search history.

(56) References Cited

U.S. PATENT DOCUMENTS

| | | | | | |
|---|---|---|---|---|---|
| 4,649,382 | A | * | 3/1987 | Martin et al. | 345/105 |
| 5,082,355 | A | * | 1/1992 | Warszawski | 359/265 |
| 5,444,330 | A | * | 8/1995 | Leventis et al. | 313/506 |
| 5,880,872 | A | * | 3/1999 | Udaka | 359/273 |
| 6,631,022 | B1 | * | 10/2003 | Kihira et al. | 359/265 |
| 2002/0171798 | A1 | * | 11/2002 | Tanaka et al. | 349/153 |
| 2003/0156314 | A1 | * | 8/2003 | Shinozaki et al. | 359/273 |

FOREIGN PATENT DOCUMENTS

| | | |
|---|---|---|
| EP | 1055961 | 5/2000 |
| JP | 61-261782 | 11/1986 |
| JP | 64-26887 | 1/1989 |

* cited by examiner

*Primary Examiner*—Richard Hjerpe
*Assistant Examiner*—Shaheda A Abdin
(74) *Attorney, Agent, or Firm*—Rockey, Depke & Lyons, LLC; Robert J. Depke (57) ABSTRACT

A display apparatus is capable of performing a gradation display and a high-speed low-power-consumption display by controlling the colored state of each pixel to an appropriate state. A driving method for the display apparatus displays images through deposition and dissolution of a metal by impressing a predetermined voltage on each pixel. A voltage pulse or AC voltage having an amplitude of not more than a threshold for deposition of the metal is impressed, and a writing pulse or an erasing pulse is controlled according to the resultant current. Alternatively, an additional writing pulse is impressed when the current is lowered to or below a predetermined value, after the writing. Further, the state of the pixel is detected through the current, and a rewriting operation is selected according to the detected state.

20 Claims, 10 Drawing Sheets

DRIVING METHOD FOR DISPLAY APPARATUS

This application claims priority to Japanese Patent Application Number JP2002-159479, filed May 31, 2002, and Japanese Patent Application Number JP2003-100501, filed Apr. 3, 2003 which are incorporated herein by reference.

TECHNICAL FIELD

The present invention relates to a method of driving a display apparatus of the metal deposition type in which display is conducted through deposition and dissolution of a metal, and particularly to a method of driving a display apparatus which is suited to the so-called electronic paper or the like.

BACKGROUND ART

In recent years, attendant on the spread of networks, documents hitherto distributed in the form of printed matter have come to be transmitted in the form of the so-called electronic documents. Further, books and magazines have come to be often provided in the form of the so-called electronic publishing. In order to read these pieces of information, reading from CRTs (cathode ray tubes) and liquid crystal displays of computers has conventionally been widely conducted.

However, in a light emission type display such as the CRT, it has been pointed out that the display causes conspicuous wearing on an ergonomic ground and, therefore, is unsuited to long-time reading. In addition, even a light reception type display such as a liquid crystal display is said to be similarly unsuited to reading, because of the flickering which is intrinsic of fluorescent tubes. Furthermore, both of the types have the problem that the reading place is limited to the places where computers are disposed.

In recent years, reflection type liquid crystal displays not using a backlight have put to practical use. However, the reflectance in non-display (display of white color) of the liquid crystal is 30 to 40%, which means a considerably bad visibility, as compared with the reflectance of printed matter printed on papers (the reflectance of OA papers and pocket books is 75%, and the reflectance of newspapers is 52%). In addition, the glaring due to reflectors and the like are liable to cause wearing, which also is unsuited to long-time reading.

In order to solve these problems, the media so-called paper-like displays or electronic papers have been being developed. These media mainly utilize coloration by moving colored particles between electrodes through electrophoresis or by rotating dichroic particles in an electric field. In these methods, however, the gaps between the particles absorb light, with the result that contrast is worsened and that a practical-use writing speed (within 1 sec) cannot be obtained unless the driving voltage is 100 V or higher.

As compared with the displays of these systems, electrochemical display devices for color development based on an electrochemical action (electrochromic display: ECD) are better in contrast, and they have already been put to practical use as light control glass or timepiece displays. It should be noted here that the light control glass and timepiece displays are not directly suited to the electronic paper or the like uses, since it is intrinsically unnecessary to perform matrix driving. Besides, they are generally poor in quality of black color, and the reflectance thereof remains at a low level.

In addition, in such displays as electronic papers, they are continuedly exposed to solar light or room light on a use basis. In an electrochemical display device put to practical use in the light control glass and timepiece displays, an organic material is used for forming black-colored portions. This leads to a problem concerning light resistance. In general, organic materials are poor in light resistance, and the black color density thereof is lowered through fading when used for a long time.

In order to solve these technical problems, there has been proposed an electrochemical display device using metal ions as a material for color change. In the electrochemical display device, the metal ions are preliminarily mixed into a polymer electrolyte layer, the metal is deposited and dissolved by electrochemical redox reactions, and the change in color attendant on this is utilized to perform display. Here, for example, when the polymer electrolyte layer contains a coloring material, it is possible to enhance the contrast in the case where the color change occurs.

Meanwhile, in the metal deposition type electrochemical display device based on deposition and dissolution of the metal, a threshold voltage which is the deposition overvoltage is utilized to achieve display. In each pixel, the metal is deposited when a minus voltage in excess of the threshold voltage is impressed between electrodes, whereas the metal is dissolved when a plus voltage is impressed between the electrodes.

In such a metal deposition type electrochemical display device, it is difficult to control the colored state, which is a great problem in enhancing the quality of display. For example, according to the conventional thought, the metal deposition type display device is basically designed for black-and-white display, and few attempts have been made to achieve display of gradation. This is due to the fact that it is difficult to control the colored state to an intermediate colored state with good reproducibility.

Besides, in the metal deposition type electrochemical display device, it takes a certain period of time to deposit or dissolve the metal and, therefore, problems are left as to response speed and power consumption. For example, when it is tried to once erase all pixels and to perform new writing at the time of rewriting the screen, it takes a considerable length of time and the power consumption is great.

Furthermore, in the metal deposition type electrochemical display device, there is the tendency that the display contrast would be lowered with the lapse of time, and a countermeasure against this problem is desired.

The present invention has been proposed in consideration of the above-mentioned circumstances of the related art. Accordingly, it is an object of the present invention to provide a method of driving a display apparatus by which it is possible to control the colored state of each pixel to an appropriate state, for example, a uniform state in a metal deposition type display apparatus. It is another object of the present invention to provide a method of driving a display apparatus by which it is possible to achieve display of gradations and display with high definition. It is a further object of the present invention to provide a method of driving a display apparatus by which it is possible to contrive a higher display speed and a lower power consumption of the apparatus. It is yet another object of the present invention to provide a driving method by which it is possible to sustain images for a long time in a metal deposition type display apparatus.

DISCLOSURE OF INVENTION

In order to attain the above objects, the method of driving a display apparatus according to the present invention is firstly characterized in that the driving method is a method of driving a display apparatus for displaying an image through deposition and dissolution of a metal by impressing a predetermined voltage on each pixel, wherein a voltage pulse or AC voltage having an amplitude of not more than a threshold for deposition of the metal is impressed, and, according to the resulting current, a writing pulse or an erasing pulse is controlled.

A metal deposition type display apparatus has a hysteresis in current-voltage characteristic such that when a negative impressed voltage exceeds a threshold, a current begins to flow to cause deposition of a metal, and, thereafter, the current flowing condition is maintained even if the voltage is reduced to or below the threshold. In the display apparatus having such a current-voltage characteristic, when voltage scanning is conducted by limiting the negative voltage range to the range of not more than the threshold, the resistance in the vicinity of zero voltage is gradually raised as the colored density is lowered.

Where a pulse voltage or AC voltage having a voltage of less than the threshold is impressed and the resulting current (namely, the resistance) is measured by utilizing the above-mentioned phenomenon, it is possible to detect the colored state. In the present invention, the negative writing voltage or the positive erasing voltage which is impressed is controlled according to the colored state detected, whereby density control is performed. By this operation, the colored density of each pixel is accurately controlled to a predetermined level.

The method of driving a display apparatus according to the present invention is secondly characterized in that the driving method is a method of driving a display apparatus for forming an image through deposition and dissolution of a metal by impressing a predetermined voltage on each pixel, wherein, after writing is conducted by impressing a voltage of not less than a threshold for deposition of the metal, a voltage pulse or AC voltage having an amplitude of not more than a threshold for deposition of the metal is impressed, and, when the resulting current is decreased to or below a predetermined value, an additional writing pulse is impressed.

As has been described above, the colored state can be grasped by measuring the above-mentioned current value, and the colored state (the density of the pixel) is maintained when additional writing by the additional writing pulse is conducted when the current value is decreased attendant on the progress of the dissolution of the metal.

The method of driving a display apparatus according to the present invention is thirdly characterized in that the driving method is a method of driving a display apparatus for displaying an image through deposition and dissolution of a metal by impressing a predetermined voltage on each pixel, wherein a voltage pulse or AC voltage having an amplitude of not more than a threshold for deposition of the metal is impressed, the writing condition of each pixel is detected according to the resulting current, and a rewriting operation is selected according to the detection results.

In the case of the third-named invention, first, by measuring the above-mentioned current value, it is detected whether the pixel state is the colored state (black) or the non-colored state (white) on a pixel basis. Then, according to the detection results and the black/white state of the pixels after rewriting, a selection is made among no operation, erasure, writing, density additional writing, etc. For example, where a pixel in the black state is in the black state even after rewriting or where a pixel in the white state is in the white state even after rewriting, no operation is conducted for the relevant pixel. Where a pixel in the black state should be in the white state after rewriting or where a pixel in the white state should be in the black state after rewriting, an erasing operation or a writing operation is conducted for the relevant pixel. By this method, it suffices to perform the driving a minimum required number of times, whereby the rewriting can be achieved in a minimum time and with a minimum power consumption.

BEST MODE FOR CARRYING OUT THE INVENTION

Now, the method of driving a display apparatus to which the present invention has been applied will be described in detail below referring to the drawings.

Prior to the description of the driving method, first, an example of configuration of the display apparatus which is the object of the present invention will be described.

Figure 1:
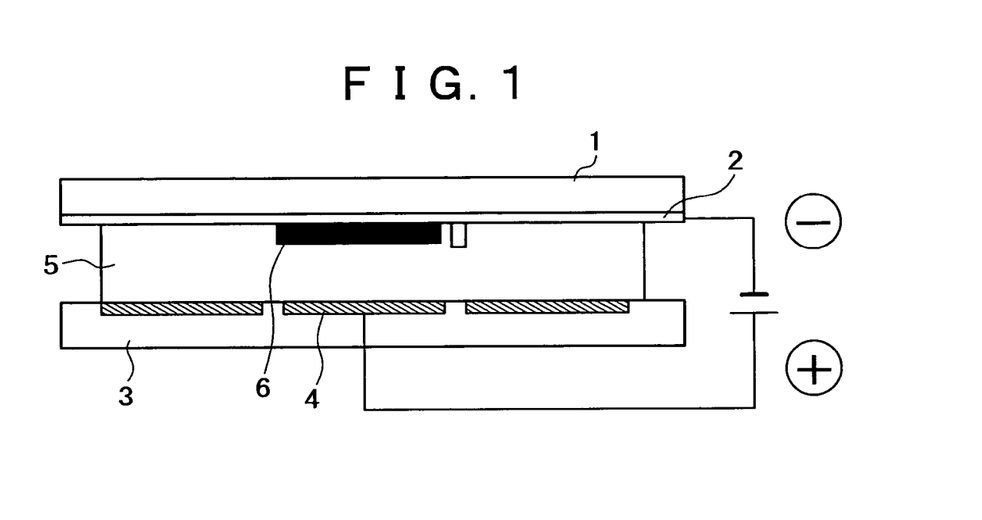
FIG. 1 is a general sectional view showing one example of a metal deposition type display apparatus of a simple matrix system.
Figure 2:
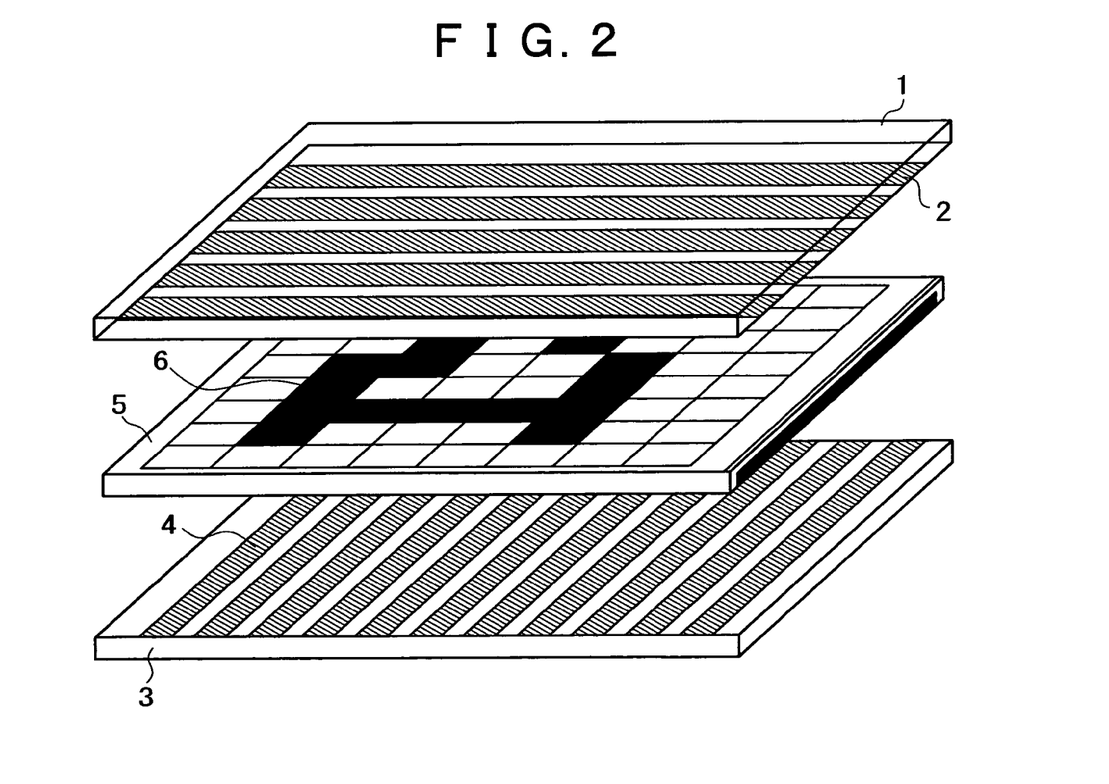
FIG. 2 is a general exploded perspective view showing one example of the metal deposition type display apparatus of the simple matrix system.

The display apparatus in this example is an electrochemical display apparatus for displaying images through deposition and dissolution of a metal by utilizing electric deposition characteristics of the metal, and is driven by a simple matrix driving system. Therefore, the driving electrodes consist of a first electrode group $X_1, X_2 \ldots$ and a second electrode group $Y_1, Y_2 \ldots$ orthogonal thereto, which are intersectingly arranged in a lattice pattern. FIGS. 1 and 2 show a specific structure of the driving electrodes, in which stripe form transparent column electrodes 2 corresponding to the first electrode group are formed on a transparent substrate 1. A base substrate 3 provided thereon with stripe form counter electrodes (row electrodes) 4 corresponding to the second electrode group is disposed opposite to the transparent substrate 1, and these substrates are laid on each other, with a polymer electrolyte layer 5 therebetween. The transparent column electrodes 2 and the row electrodes 4 are provided in predetermined numbers according to the desired number of pixels, and the intersections of the two kinds of electrodes constitute pixels. With a voltage impressed selectively between the transparent column electrodes 2 and the row electrodes 4, a metal 6 is deposited, with the result of coloring of the pixels.

In the above configuration, a transparent glass substrate such as a quartz glass plate and a white plate glass plate can be used as the transparent substrate 1, but the transparent glass substrate is not limitative. Examples of the material which can be used for the transparent substrate 1 include esters such as polyethylene naphthalate, polyethylene terephthalate, etc., polyamides, polycarbonates, cellulose esters such as cellulose acetate, etc., fluoro polymers such as polyvinylidene fluoride, tetrafluoroethylene-hexafluoropropylene copolymer, etc., polyethers such as polyoxymethylene, etc., polyacetal, polystyrene, polyolefins such as polyethylene, polypropylene, methylpentene polymer, etc., and polyimides such as polyimide-amides, polyether imides, etc. Where one of these synthetic resins is used as a support, a rigid substrate which cannot easily be bent can be obtained, and a flexible film form substrate can also be obtained.

For the transparent electrodes 2, it is preferable to use, for example, a mixture of $In_2O_3$ and $SnO_2$, i.e., the so-called ITO film or a film coated with $SnO_2$ or $In_2O_3$. Films obtained by doping the ITO film or the $SnO_2$- or $In_2O_3$-coated film with Sn or Sb can also be used, and, further, MgO, ZnO and the like can also be used.

On the other hand, examples of the matrix polymer to be used for the polymer electrolyte layer 5 include polyethylene oxide, polyethyleneimine, and polyethylene sulfide, the skeleton units of which are represented by the formulas $-(C-C-O)_n-$, $-(C-C-N)_n-$, and $-(C-C-S)_n-$. With the skeleton units as main chain structures, branching may be present. Besides, polymethyl methacrylate, polyvinylidene fluoride, polyvinylidene chloride, polycarbonates and the like are also preferable for this use.

In forming the polymer electrolyte layer 5, a required plasticizer is preferably added to the matrix polymer. Preferred examples of the plasticizer include water, ethyl alcohol, isopropyl alcohol, and mixtures thereof in the case where the matrix polymer is hydrophilic, and include propylene carbonate, dimethyl carbonate, ethylene carbonate, γ-butyrolactone, acetonitrile, sulfolane, dimethoxyethane, ethyl alcohol, isopropyl alcohol, dimethyl formamide, dimethyl sulfoxide, dimethyl acetamide, n-methylpyrrolidone, and mixtures thereof in the case where the matrix polymer is hydrophobic.

The polymer electrolyte layer 5 is formed by dissolving an electrolyte in the matrix polymer. Examples of the electrolyte includes not only metallic salts capable of functioning as a color forming material for display but also quaternary ammonium halides (F, Cl, Br, I), alkali metal halides (LiCl, LiBr, LiI, NaCl, NaBr, NaI, etc.), alkali metal cyanides, and alkali metal thiocyanides, and a material containing at least one support electrolyte selected from these compounds is dissolved as an electrolyte. Here, examples of the metal ions constituting the metallic salt capable of functioning as a color forming material for display include bismuth, copper, silver, lithium, iron, chromium, nickel, and cadmium, which are used either singly or in combination. The metallic salt may be an arbitrary salt of any of these metals; examples of the suitable silver salt include silver nitrate, silver borofluoride, silver halide, silver perchlorate, silver cyanide, and silver thiocyanide.

Besides, a coloring material may be added to the polymer electrolyte layer 5, for enhancing contrast. Where the coloration by deposition of the metal occurs in black, it is preferable to use white color as the background color, and a white material having a high hiding property is preferably introduced as a coloring material. As such a material, white particles for coloration can be used. Examples of the white particles for coloration include titanium dioxide, calcium carbonate, silica, magnesium oxide, and aluminum oxide.

In the case of inorganic particles, the ratio in which the white pigment is mixed is preferably about 1 to 20% by weight, more preferably about 1 to 10% by weight, and further preferably about 5 to 10% by weight. The reason for restricting the mixing ratio in this manner is as follows. The white pigments such as titanium oxide is not soluble in polymers but are merely dispersed in the polymers; therefore, when the mixing ratio is increased, the white pigment is coagulated, resulting in nonuniformity of optical density. Besides, the white pigments lack ionic conductivity, so that an increase in the mixing ratio leads to a lowering in the conductivity of the polymer electrolyte. In consideration of both of these points, the upper limit of the mixing ratio is about 20% by weight.

In the case where the inorganic particles are mixed into the polymer electrolyte layer 5 as a coloring material as abovementioned, the thickness of the polymer electrolyte layer 5 is preferably in the range of 10 to 200 μm, more preferably 10 to 100 μm, and further preferably 10 to 50 μm. As the polymer electrolyte layer 5 is thinner, the resistance between the electrodes is lower, which favorably leads to reductions in color forming and decoloring times and to a reduction in power consumption. However, when the thickness of the polymer electrolyte layer 5 is reduced to below 10 μm, mechanical strength is lowered, and inconveniences such as generation of pinholes and cracks would occur. Besides, when the thickness of the polymer electrolyte layer 5 is too small, the mixing ratio of the inorganic particles is low accordingly, and the whiteness property (optical density) may be insufficient.

Incidentally, where a coloring matter is used as the coloring material mixed in the polymer electrolyte layer 5, the mixing ratio of the coloring material may be not more than 10% by weight. This is because the color forming efficiency of a coloring matter is by far higher than that of inorganic particles. Therefore, when a coloring matter which is electrochemically stable is used, a sufficient contrast can be obtained even if the coloring matter is used in a small amount. As such a coloring matter, for example, oil-soluble dyes are preferred.

The base substrate 3 provided on the back side may not necessarily be transparent, and substrates, films and the like capable of securely holding the row electrodes 4 can be used as the base substrate 3. Examples of the usable substrates, films and the like include glass substrates such as quartz glass plates, white sheet glass plate, etc., ceramic substrates, paper substrates, and wood substrates. These naturally are not limitative, and synthetic resin substrates and the like can also be used. Examples of the materials of the synthetic resin substrates include esters such as polyethylene naphthalate, polyethylene terephthalate, etc., polyamides, polycarbonates, cellulose esters such as cellulose acetate, etc., fluoro polymers such as polyvinylidene fluoride, polytetrafluoroethylene-co-hexafluoropropylene, etc., polyethers such as polyoxymethylene, etc., polyacetal, polystyrene, polyolefins such as polyethylene, polypropylene, methylpentene polymer, etc., and polyimides such as polyimide-amides, polyether amides, etc.

Where any of these synthetic resins is used for the base substrate, a rigid substrate which would not easily be bent can be obtained, and a flexible film form substrate can also be obtained.

For the row electrodes 4, conductive materials, for example, metallic materials can be used. It should be noted here, however, that when there is a large potential difference between the metal constituting the row electrodes 4 and the metal to be deposited on the transparent column electrodes 2, there is the possibility that electric charges may be accumulated on the electrodes in the colored condition, and migration of the electric charges may occur, to cause coloration of unintended pixels. Particularly when the potential difference exceeds the deposition overvoltage at the time of deposition of the metal (the threshold in simple matrix driving), the above-mentioned coloration may take place. In view of this, a metal such that the potential difference between itself and the metal to be deposited as the color forming material is less than the deposition overvoltage (threshold) is desirably selected as the material of the row electrodes 4. Ideally, the material in the unionized state (metallic state) of the metal ions used as the color forming material is used as the metallic material constituting the row electrodes 4. Namely, the same metal as the metal to be deposited and dissolved is used for the row electrodes 4; for example, in the case of utilizing deposition and dissolution of silver, silver is used for the row electrodes 4. This precludes the possibility that the above-mentioned potential difference might be generated in the condition where the metal is deposited on the transparent column electrodes 2.

Other materials which can be used to constitute the row electrodes include platinum (Pt), gold (Au), and carbon (C). The use of the same metal, for example silver (Ag), as the species of the metal ions to be used for the deposition-dissolution reaction as the material of the row electrodes (counter electrodes) as above-mentioned is the most ideal system, in view of the mechanism of the reaction and the like. However, in the case where silver of the row electrodes is formed only in a thickness on the order of several hundreds of nanometers on a process basis in enhancing the fineness of the simple matrix device, the repetition of the deposition-dissolution reaction causes superposition of irreversible reactions such as dendrite growth, resulting in that silver of the row electrodes is gradually consumed and, eventually, the electrode itself may be lost. In the condition where the row electrode has been dissolved and lost, an extremely bad influence is exerted not only on the pixel corresponding to the lost electrode but also on the display as a whole, in view of the principle of the simple matrix driving. In consideration of this problem, platinum and gold can be used for the electrodes, as a metal which is nobler (stabler) on a potential basis than silver subjected to the deposition-dissolution reaction. Incidentally, the metals nobler than silver are only these two metals (platinum and gold); where one of the metals which are baser than silver on a potential basis (the metals other than silver, platinum, and gold) is used, the metal is unconditionally dissolved, and silver ions contained in the liquid electrolyte composition would be deposited on the surface of the metal in the form of replacement plating.

An additional description will be made of the phenomenon in which the above-mentioned potential difference approaches zero in the condition where the metal has been deposited on the transparent column electrodes 2 as described above. Silver, platinum, and gold have the following standard electrode potentials (in aqueous solution):

All the potential values are against the standard hydrogen electrode potential (SHE), and platinum and gold will generate the potential differences of Δ=0.38 V and 1.03 V, respectively. The generation of the potential difference cannot be obviated in a perfect initial condition. However, as the deposition-dissolution reaction is repeated, Ag is favorably left in an incompletely dissolved state on the platinum or gold electrodes, with the result that the potential difference Δ approaches zero.

Figure 3:
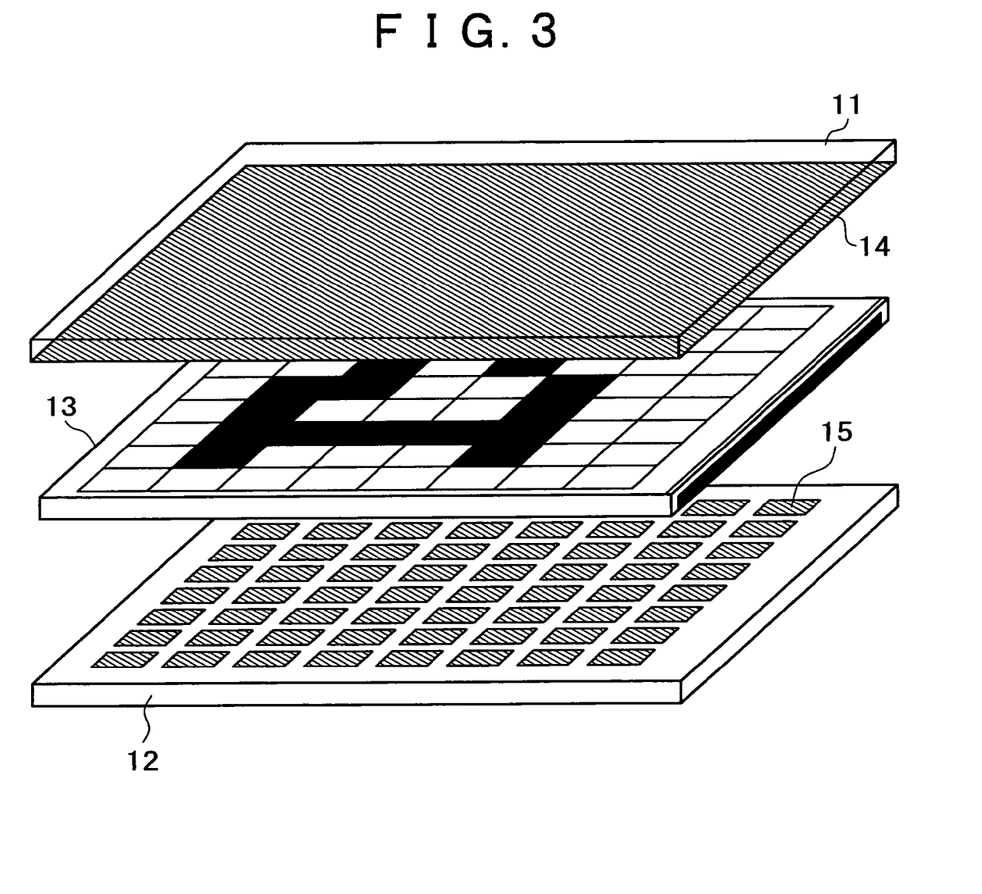
FIG. 3 is a general exploded perspective view showing one example of a metal deposition type display apparatus of an active matrix system.

While an example of configuration of the metal deposition type display apparatus of the simple matrix driving system has been described above, screen rewriting at a higher speed can be realized by adopting an active matrix system in which each pixel is respectively driven by a circuit composed of one or a plurality of thin film transistors. FIG. 3 shows an example of configuration of a display apparatus of the active matrix system.

Also in the display apparatus of the active matrix system, a transparent substrate 11 and a base substrate 12 are disposed to sandwich therebetween an electrolyte layer 13 composed of a polymer electrolyte or the like, in the same manner as in the display apparatus of the simple matrix system. Besides, the materials constituting the transparent substrate 11, the base substrate 12, and the electrolyte layer 13 and the like are also the same as in the display apparatus of the simple matrix system. The display apparatus of the active matrix system differs largely from the display apparatus of the simple matrix system in electrode structure. First, the transparent substrate 11 is provided thereon with a transparent electrode 14, which is formed on the whole surface of the transparent substrate 11, instead of being formed in a stripe pattern, and serves as a common electrode. On the other hand, dot form pixel electrodes 15 are arranged on the base substrate 12 in a matrix form correspondingly to pixels, and a thin film transistor for driving is connected to each of the pixel electrodes 15.

Figure 4:
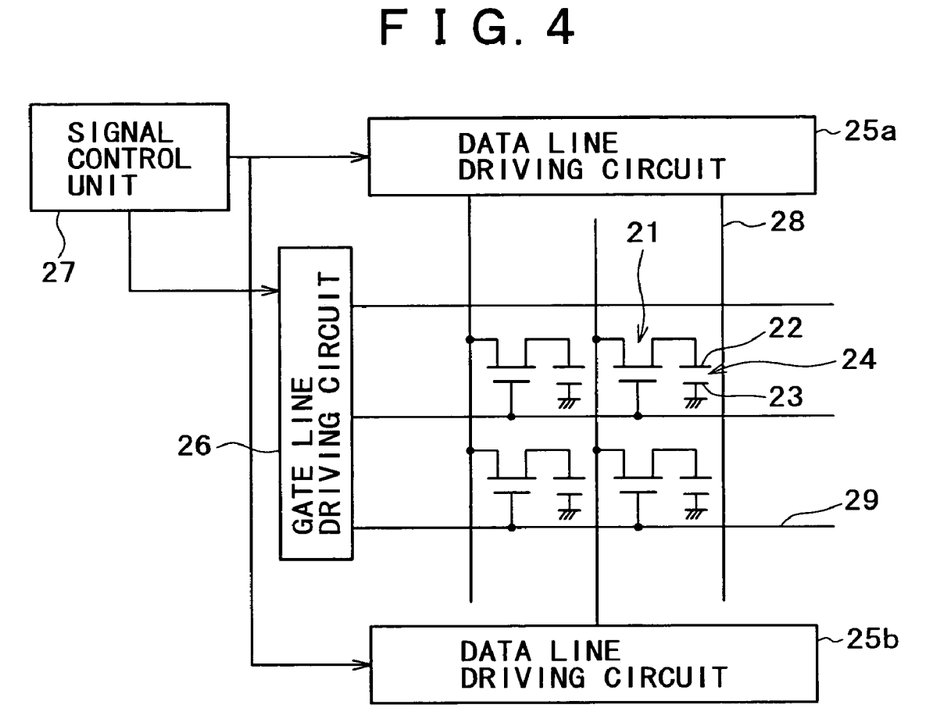
FIG. 4 is a circuit diagram showing one example of the circuit configuration of the metal deposition type display apparatus of the active matrix system.

FIG. 4 shows the circuit configuration in the display apparatus of the active matrix system. As has been described above, in the display apparatus of the active matrix system, the pixels 24 each composed of the thin film transistor 21, the pixel electrode 22, and the common electrode 23 are arranged in a matrix form. In addition, data line driving circuits 25a, 25b and a gate line driving circuit 26 for selectively driving each pixel 24 are provided. The data line driving circuits 25a, 25b and the gate line driving circuit 26 select a predetermined data line 28 or gate line 29 according to a control signal coming from a signal control unit 27, and switch the ON/OFF condition of each pixel 24.

Figure 5:
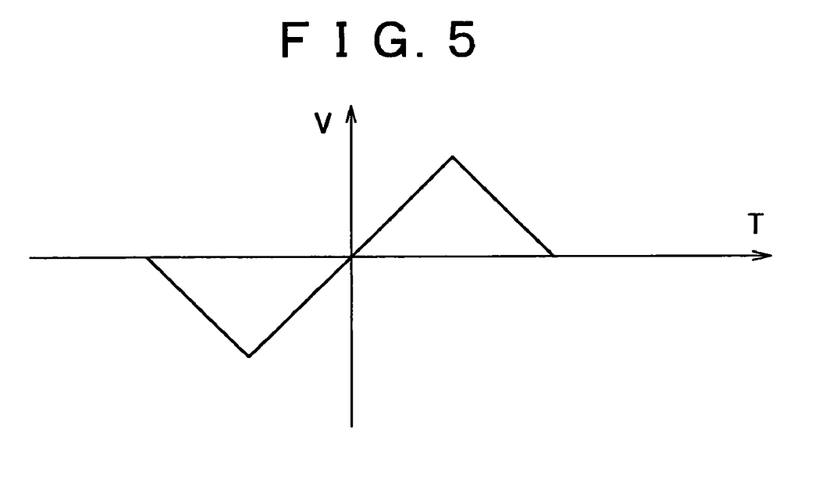
FIG. 5 is a waveform diagram showing a triangular wave voltage impressed for examining current-voltage transient response characteristic.
Figure 6:
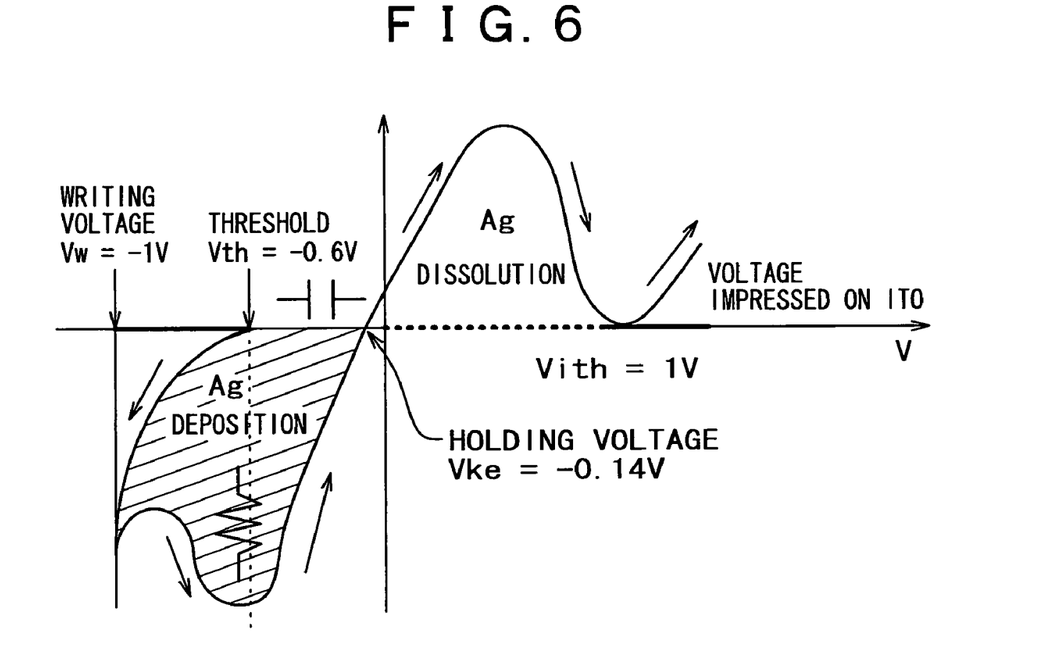
FIG. 6 is a characteristic diagram showing the current-voltage transient response characteristic.

Next, a basic driving method for this display apparatus will be described. In a display apparatus utilizing electric deposition characteristics, for example, in a display apparatus of the simple matrix system, when a triangular wave voltage as shown in FIG. 5 is impressed between a column electrode and a row electrode, a current-voltage transient response characteristic as shown in FIG. 6 is displayed. Incidentally, FIG. 6 shows an example of characteristic in the case where an Ag electrode is used as the row electrode and silver ions and iodide ions are dissolved in the polymer electrolyte.

Referring to FIG. 6, as a voltage in the range from zero to the minus side is impressed between the column electrode and the row electrode, non-deposition of silver continues for a while, and deposition of silver onto the column electrode begins when the voltage exceeds a threshold voltage $V_{th}$. This is seen from FIG. 6, in which a current attendant on deposition begins to flow when the voltage exceeds the threshold voltage $V_{th}$. Thus, each pixel has such a characteristic that a characteristic as capacitor predominates before deposition (white) and that the resistance is lowered as the deposition (black) proceeds.

When the voltage once exceeds the threshold voltage $V_{th}$ due to a writing voltage $V_w$ corresponding to an apex of the triangular wave voltage, the deposition of silver continues even when the voltage is gradually lowered, and the silver deposition continues even when the voltage is less than the threshold voltage $V_{th}$. The deposition of silver ends when the impressed voltage is lowered to a holding voltage $V_{ke}$. In other words, once the impressed voltage exceeds the threshold voltage $V_{th}$ and nuclei (seeds) are formed, the silver deposition occurs even at a voltage of not more than the threshold voltage $V_{th}$.

On the other hand, when a voltage in the reverse polarity (plus) is impressed between the column electrode and the row electrode, dissolution of silver begins, and the deposited silver disappears at the time when the impressed voltage reaches an erasing voltage $V_{ith}$. When a voltage of not less than this value is impressed, iodine is librated to be deposited on the electrode, resulting in coloration in yellow.

Figure 7:
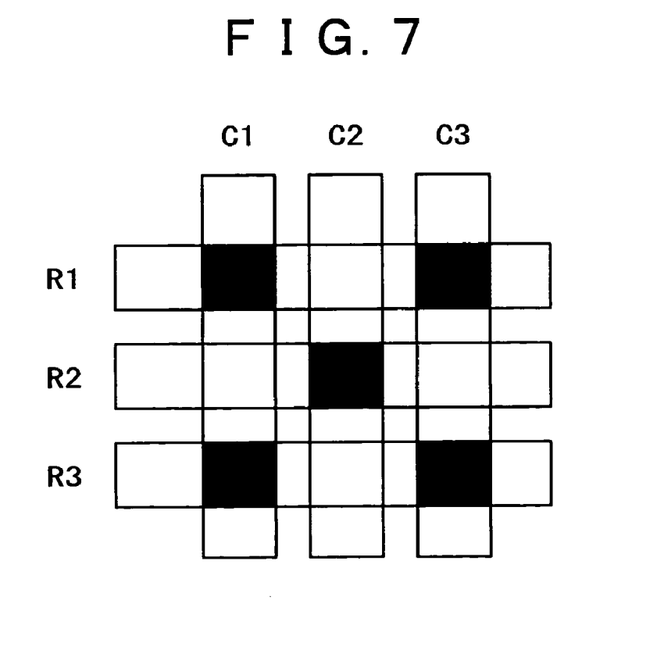
FIG. 7 is a schematic view of a panel of 3×3 pixels.

Considering the driving of the display apparatus showing the above-mentioned current-voltage transient response characteristic, the simplest mode resides in that a voltage in excess of the above-mentioned threshold voltage is impressed at the time of address driving, to deposit silver, thereby performing writing of the pixel. Hereinafter, for simplification of description, monochromic display by use of 3×3 pixels shown in FIG. 7 will be taken as an example, and a basic driving method for the metal deposition type display apparatus will be described.

Figure 8:
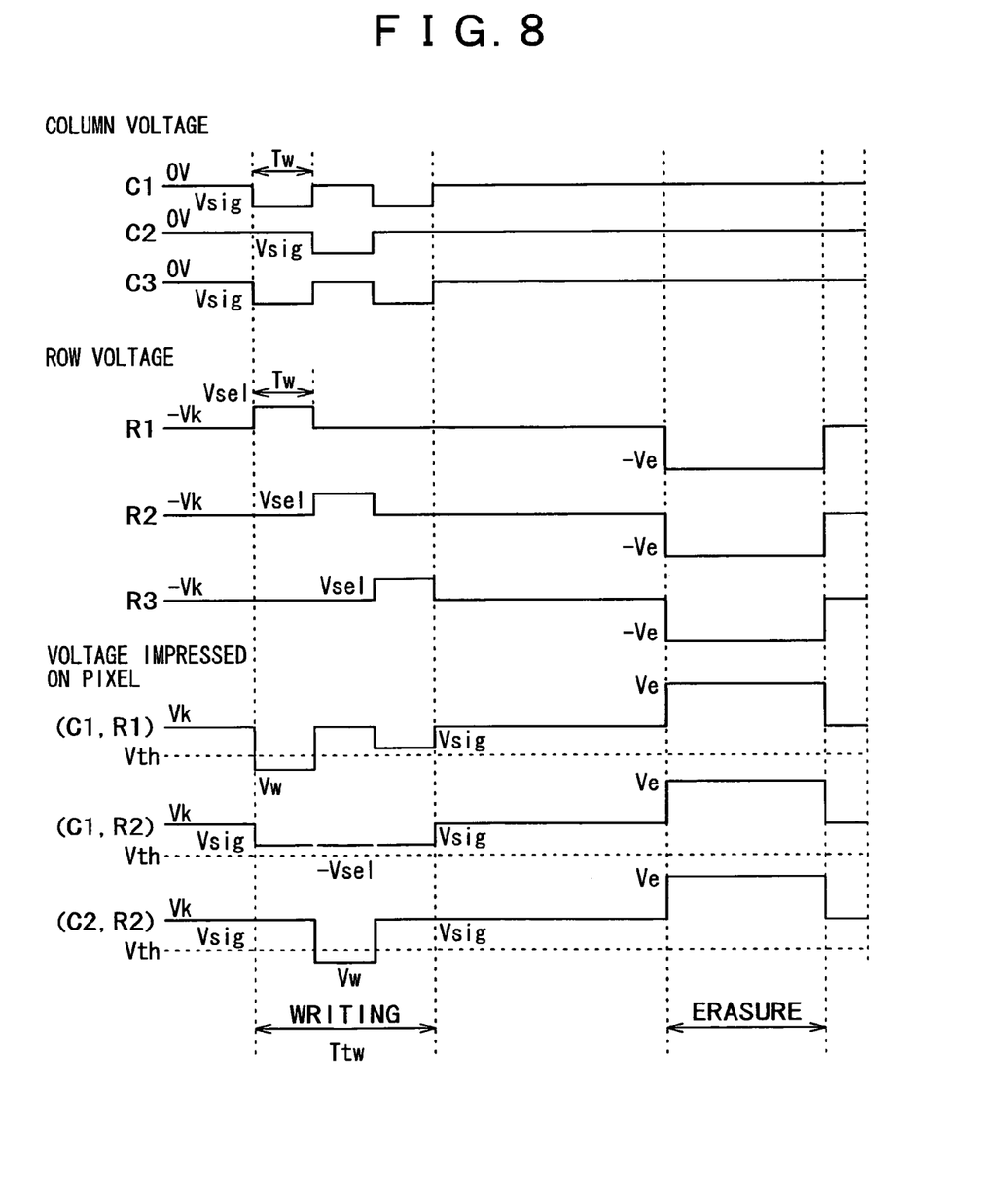
FIG. 8 is a waveform diagram showing a driving voltage waveform in a basic driving method for a metal deposition type display apparatus.

FIG. 8 shows one example of a driving voltage waveform for performing display by utilizing the threshold voltage for deposition, in the metal deposition type display apparatus such that silver is deposited on the column electrode when a minus voltage impressed exceeds the threshold voltage $V_{th}$ and that silver is dissolved when a plus voltage is impressed. In FIG. 8, there are shown column voltages impressed on column electrodes $C_1$, $C_2$, and $C_3$, row voltages impressed on row electrodes $R_1$, $R_2$, and $R_3$, and voltages impressed on pixels $(C_1, R_1)$, $(C_1, R_2)$, and $(C_2, R_2)$.

At the time of display, a signal writing voltage pulse $V_{sig}$ less than the threshold voltage $V_{th}$ is impressed on each of the column electrodes $C_1$, $C_2$, and $C_3$, and a selecting voltage pulse $V_{sel}$ less than the threshold voltage $V_{th}$ is impressed on each of the row electrodes $R_1$, $R_2$, and $R_3$, for operations of sequential selection from the upper side. In this case, a voltage (writing voltage $V_w$) ($=V_{sig}-V_{sel}$) in excess of the threshold voltage $V_{th}$ is impressed only on the pixels where silver is to be deposited, to effect deposition of silver on the transparent column electrodes, whereby writing is performed.

For example, at the pixels $(C_1, R_1)$ and $(C_2, R_2)$, the signal writing voltage pulse $V_{sig}$ on the column electrodes $C_1$ and $C_2$ and the selecting voltage pulse $V_{sel}$ on the row electrodes $R_1$ and $R_2$ overlap with each other, whereby the writing voltage $V_w$ due to the voltage difference between the voltage pulses is impressed, to effect silver deposition (writing). On the other hand, at the pixel $(C_1, R_2)$, the signal writing voltage pulse $V_{sig}$ on the column electrode $C_1$ and the selecting voltage pulse $V_{sel}$ on the row electrode $R_2$ do not overlap with each other in any period, and only one of the signal writing voltage pulse $V_{sig}$ and the selecting voltage pulse $V_{sel}$, which are less than the threshold voltage $V_{th}$, is impressed; therefore, silver deposition does not take place, and writing on the pixel is not performed.

After the writing, the display can be memorized by opening or shortcircuiting both the column electrodes and the row electrodes. In addition, when an erasing voltage $-V_e$ is impressed on the row electrodes $R_1$, $R_2$, and $R_3$ at a predetermined timing so that a plus voltage $V_e$ is impressed on each pixel, dissolution of silver is effected, whereby erasure is performed. Incidentally, the erasing voltage $V_e$ is set to be equal to or slightly lower than the erasing voltage $V_{ith}$ in FIG. 6 above. If the erasing voltage $V_e$ exceeds the erasing voltage $V_{ith}$, coloration may occur.

While the basic driving method has been described above, in the present invention, in the display apparatus having the configuration as above described, a display in an appropriate density is realized and a display of gradations can be conducted by a control method as described below.

When voltage scanning by limiting a negative voltage range is applied to the current-voltage characteristic shown in FIG. 6, the resistance in the vicinity of zero voltage is higher in the case of a non-colored condition or an insufficiently colored condition, as compared with the case of complete coloration by scanning at a sufficient voltage. The resistance is highest in the non-colored condition, and is lowest in the case of complete coloration; the resistance has a value according to the degree of coloration.

By utilizing this phenomenon and by first impressing a pulse voltage (or AC voltage) at a voltage less than the coloration threshold, measuring the resulting current, i.e., the resistance (detection of condition) and subsequently applying an appropriate amount of a negative writing voltage, it is possible to control the density. For example, a voltage pulse of 0.1 volt and 10 ms is impressed as a detection pulse, and the resistance (current value) is measured. Next, a negative voltage pulse of 1 volt and 10 ms is impressed as a writing pulse. This cycle is repeated until the resistance is brought to a target value, whereby coloration can be achieved while constantly controlling the respective densities.

By carrying out such a coloration control, it is also possible to achieve a gradation display. When voltage scanning is conducted by limiting the negative voltage range, the resistance in the vicinity of zero voltage shows a value according to the degree of coloration. Therefore, it suffices to set each gradation and the relevant resistance value (current value) in correspondence with each other, and to perform the density control based thereon.

In the case of erasing a colored pixel, a positive voltage is impressed to cause an appropriate current to flow, whereby silver is dissolved, resulting in that the pixel is made transparent. As shown in FIG. 6, when a positive voltage is impressed in excess, not only the color is erased but also iodine is librated, to cause coloration in yellow, in the case where silver iodide is used as dissolved ions, for example. For achieving appropriate coloration while preventing this phenomenon, it is effective to detect the resistance value and to control the erasure, in the same manner as in the control of coloration mentioned above.

Specifically, when a cycle of first measuring the current, i.e., the resistance (detection of condition) by impressing a pulse voltage (or AC voltage) at a voltage less than the coloration threshold and subsequently applying a positive erasing voltage with an appropriate amplitude and an appropriate time is repeated, it is possible to achieve appropriate erasure and, by utilizing this, to control the density. For example, a positive or negative voltage pulse of 0.1 volt and 10 ms is impressed as a detection pulse, and the resistance (current) is measured. Subsequently, a positive voltage pulse of 1 volt and 10 ms is impressed as an erasing pulse. With this cycle repeated until the resistance is brought to a target value, it is possible to constantly control the respective densities.

The above-mentioned phenomenon can be utilized also for control of fading. In the above-mentioned display apparatus, by returning the voltage to zero or opening the circuit after the coloration, the colored state can be maintained for a certain length of time (several tens of minutes at room temperature); however, silver is gradually dissolved and the coloration density (optical density) is gradually lowered, with the lapse of time. In order to maintain the density for a long time, appropriate writing according to the deficient density is conducted, which is effective also for minimizing the power consumption.

By applying the above-mentioned control, the current flowing due to the state detecting pulse is detected, and an additional writing pulse is impressed when the current is decreased to or below a predetermined value, whereby the density can be maintained for a long time. As has been described above, when voltage scanning is conducted by limiting a negative voltage range, the resistance in the vicinity of zero voltage rises as the density is lowered. In view of this, the state detecting pulse is periodically impressed after writing, the resultant current is monitored, and, when the measured resistance exceeds a predetermined level, it is judged that the density has been lowered, and an additional writing pulse is impressed.

Furthermore, an application to control of rewriting can be made. For example, in rewriting a black-white two-valued screen for displaying characters or the like, it can be contemplated to rewrite a current screen into a next screen according to the current screen condition by the following technique. First, whether the current state of each pixel is white (non-colored state) or black (colored state) is detected by use of a state detecting pulse or a minute AC voltage. Next, rewriting is conducted through selection among "no operation", "erasure", "writing", and "density adding writing", according to the black/white state of the pixel after rewriting.

For example, where a pixel in the black state is to be in the black state also after rewriting or where a pixel in the white state is to be in the white state also after rewriting, no operation is conducted as a rewriting operation. Where a pixel in the black state is to be in the white state after rewriting or where a pixel in the white state is to be in the black state after rewriting, an erasing operation or a writing operation is conducted. This ensures that a minimum required operation is only needed, and the rewriting of a screen can be achieved in a minimum time and with a minimum power consumption.

Embodiments

Next, specific embodiments to which the present invention has been applied will be described, based on experimental results.

[Production of Stripe Form Electrodes]

First Electrodes (Display Electrodes): On a polycarbonate substrate measuring 10 cm×10 cm and 0.2 mm in thickness, stripe form transparent electrodes and an insulation film were formed in the following procedure. Incidentally, the stripe form transparent electrodes have a stripe width of 150 µm and a pitch of 170 µm, and the size of an opening portion (a portion not covered with the insulation film) is 140 µm square.

First, an ITO film with a film thickness of 500 nm and a sheet resistance of 12Ω/□ was formed on the above-mentioned polycarbonate substrate by sputtering. Next, a photoresist was applied to the ITO film, and the photoresist was processed into a desired stripe shape by lithography. Followingly, the polycarbonate substrate was immersed in an ITO etching solution, to remove the portions of the ITO film which were not covered with the photoresist. Subsequently, the remaining photoresist was removed by use of an organic solvent such as acetone.

Next, a film of $SiO_2$ was formed in a thickness of 200 nm on the stripe form ITO film by a plasma CVD method using TEOS (Tetra-Ethoxy Ortho-Silicate: $Si(OC_2H_5)_4$) and $O_2$. A photoresist is applied to the $SiO_2$ film, and the photoresist was processed into a desired stripe shape by lithography. The substrate was then immersed in a mixed solution of ammonium fluoride, hydrofluoric acid and the like, to remove the portions of the $SiO_2$ film which were not covered with the photoresist. Subsequently, the remaining photoresist was removed by use of an organic solvent such as acetone.

Second Electrodes (Counter Electrodes): The counter electrodes were produced by the following procedure. Copper electrodes were formed in a stripe form on a base substrate made of polycarbonate or PET (polyethylene terephthalate) or an epoxy-based resin such as a glass-epoxy resin used for circuit substrates. The stripe form copper electrodes were formed by the method as follows. First, a film of copper was formed on the entire surface of the base substrate by sputtering or the like. Subsequently, a photoresist was applied to the whole surface of the copper electrode, the photoresist was covered with a metal mask or UV-shielding mask formed in a stripe pattern, followed by irradiation with UV rays. The photoresist and the electrode in the areas masked by lithography were removed by wet etching or dry etching so that each of the stripe form electrodes was insulated. Next, an electric field was applied to the stripe form electrodes, which were immersed in a solution containing silver or a desired metal dissolved therein, and silver was deposited on the electrodes by an electroplating method, to produce the counter electrodes.

In the counter electrodes, the thickness of copper is about 15 µm, the thickness of silver is about 15 µm, and the total electrode thickness is about 30 µm. Incidentally, an electroless plating method of depositing silver or the metal without applying an electric field is also known, but the electroplating method is desirable because the thickness of the metal deposited is large.

The base substrate is desirably so formed that the interval of the pixels for display is as small as possible. Besides, in the base substrate, the gaps between the pixels are covered with a solid electrolyte; on the assumption that the solid electrolyte is transparent or translucent, it is preferable to use a white substrate.

[Production of Display Electrodes, Preparation of Polymer Solid Electrolyte, and Application Thereof]

A mixture of 1 part by weight of polyvinylidene fluoride having a molecular weight of about 350,000, 10 parts by weight of dimethyl sulfoxide, 1.7 parts by weight of silver iodide, and 1 part by weight of sodium iodide was heated to 120° C., to prepare a uniform solution. Next, 0.2 part of titanium dioxide having an average particle diameter of 0.5 µm was added to the solution, and was dispersed uniformly by a homogenizer. The resulting liquid was applied to the above-mentioned glass substrate in a thickness of 20 µm by use of a doctor blade, then the second electrodes were immediately adhered thereto, and the resulting assembly was vacuum dried at 110° C. under a pressure of 0.1 MPa for 1 hr, whereby a gelled polymer solid electrolyte was formed between the two kinds of electrodes. Next, end faces of the laminate were sealed with an adhesive.

[Driving and Evaluation of Display Characteristics]

A colored (black) display and a non-colored (white) display were changed over by selecting a desired set of the stripe form electrodes, passing a current in an amount of 2 µC per one pixel to the display electrodes for 0.1 sec, to cause a reduction reaction on the display electrode side, at the time of color formation, and passing the same amount of current to cause oxidation at the time of decoloring. The reflectance at the time of non-coloring (white) was 85%, and the optical density (OD) of the display portion at the time of color forming (black) was about 1.4 (reflectance: 4%). The pixels which were not selected did not undergo color forming or decoloring.

[Current-Voltage Characteristic]

Figure 9:
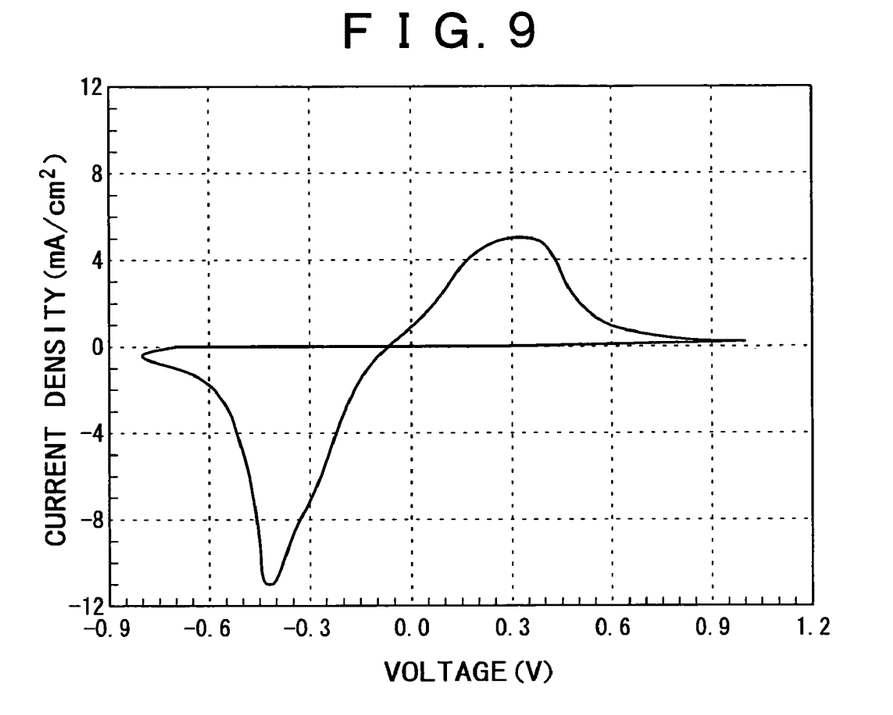
FIG. 9 is a characteristic diagram showing the current-voltage characteristic of a display apparatus manufactured.

The display apparatus having the above-mentioned structure using silver ions as metal ions and using ITO for the transparent electrodes was subjected to measurement of current-voltage characteristic with the first electrodes set positive, to obtain the results as shown in FIG. 9. Specifically, in the case where a negative voltage is applied to the first electrode, the current is extremely small and negligible when the voltage is not more than a certain level (threshold: 0.8 volt in this case). On the other hand, when the voltage exceeds the threshold, a current begins to flow, and coloration occurs at the first electrode. The current flowing condition is maintained even if the voltage is reduced to or below the threshold. Further, when a reverse voltage, i.e., a positive voltage is applied to the first electrode to cause a current to flow, the color gradually disappears, the current also decreases, and, when the color disappears completely, the current becomes extremely small. The presence of such a hysteresis in the current-voltage characteristic is a feature of this device.

Figure 10:
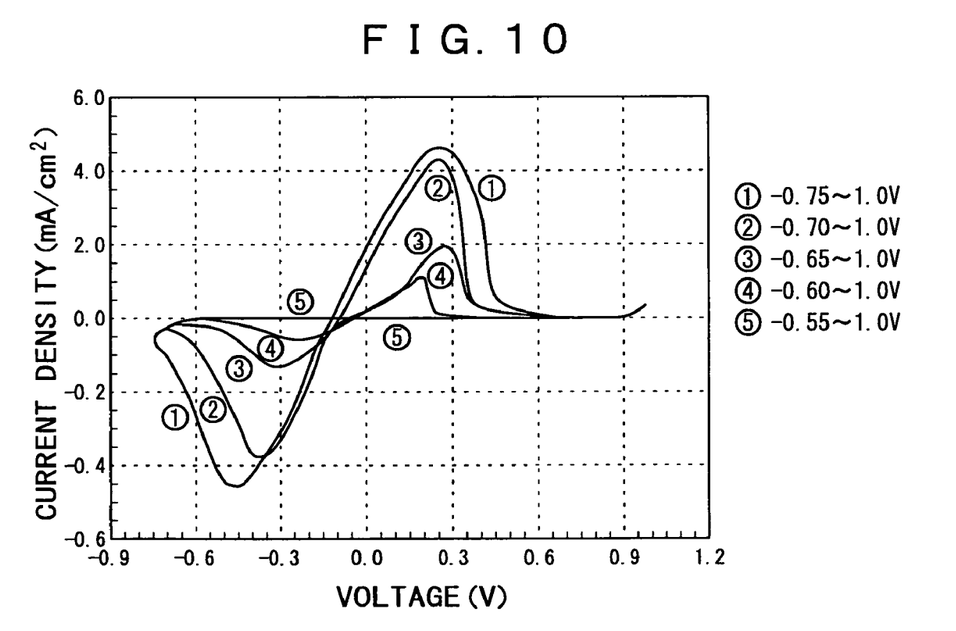
FIG. 10 is a characteristic diagram showing the difference in current-voltage characteristic when a writing scan voltage is varied.
Figure 11:
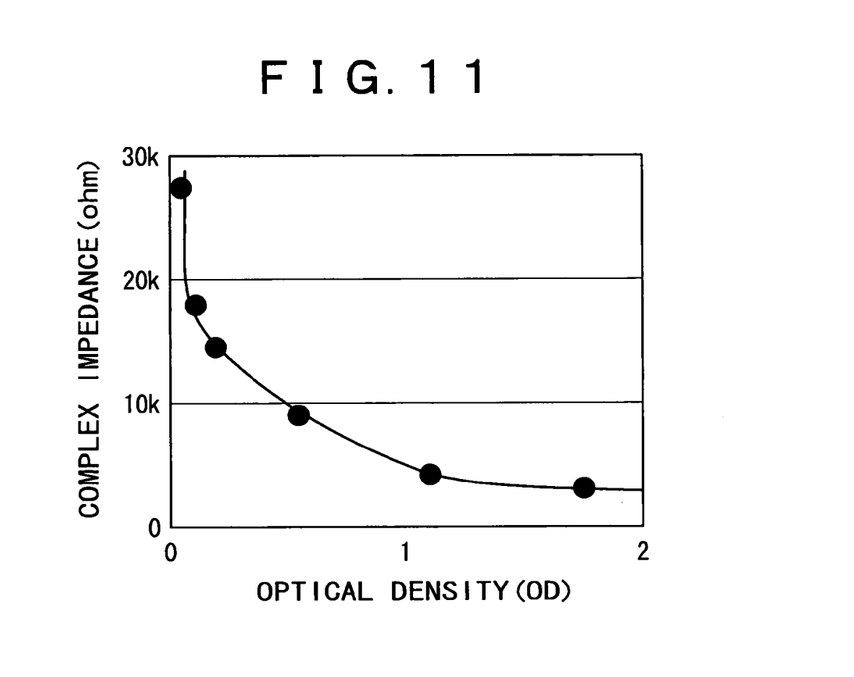
FIG. 11 is a characteristic diagram showing the relationship between colored density (optical density) and complex impedance.

When voltage scanning while limiting the negative voltage range is applied to the current-characteristic shown in FIG. 9, the resistance in the vicinity of zero voltage is higher than that in the case of complete coloration by scanning at a sufficient voltage, as shown in FIG. 10. The results of monitoring the resistance (complex impedance) by actually applying an AC voltage of 0.1 V are shown in FIG. 11. It is seen that the complex impedance is lowered as the coloration density (optical density) is increased.

[Coloration Control]

Coloration control is conducted by utilizing the above-mentioned phenomenon. First, an AC or pulse voltage at a voltage (0.1 to 0.5 V) less than the coloration threshold is applied, the resulting current, i.e., the resistance is measured (detection of condition), and then an appropriate amount of negative writing voltage is applied, whereby density can be controlled.

Figure 12:
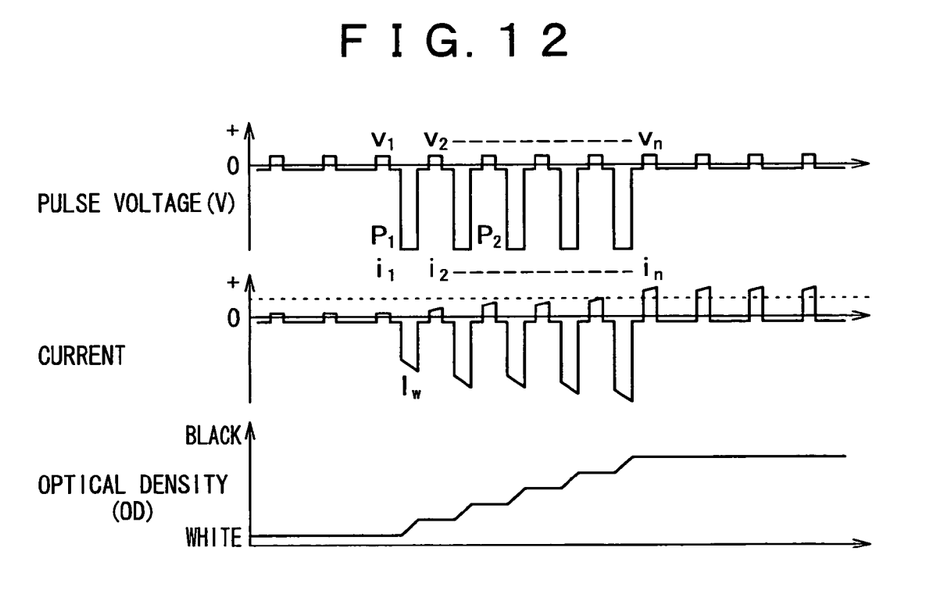
FIG. 12 is a waveform diagram showing one example of coloration control.

A specific example of this is shown in FIG. 12. FIG. 12 shows the pulse voltage impressed on the pixel, the current flowing due to the application of the pulse voltage, and the optical density (OD) of the pixel. In the current value, the line indicated by broken line is a standard current value serving as a desired optical density level. The standard current value is preset based on FIG. 11 above.

In this embodiment, first, prior to writing, a detection voltage pulse $v_1$ of 0.1 volt and 10 ms is impressed, and the current $i_1$ (resistance) is measured. Here, since the current $i_1$ is less than the above-mentioned standard current, a negative writing voltage pulse $P_1$ is impressed. The negative writing voltage pulse $P_1$ is $-1$ V and 10 ms here. When the negative writing voltage pulse $P_1$ is impressed, a current $I_w$ flows, to cause deposition of silver. After the application of the writing voltage pulse $P_1$, a detection voltage pulse $v_2$ of 0.1 volt and 10 ms is again impressed, and the current $i_2$ (resistance) is measured. Although the density is raised by one step, the density is insufficient as compared with the preset density, and the current $i_2$ is also below the standard current value; therefore, a writing voltage pulse $P_2$ is again impressed. This cycle is repeated until the current $i_n$ upon application of the detection voltage pulse $v_n$ exceeds the standard current value. When the current $i_n$ upon application of the detection voltage pulse $v_n$ has exceeded the standard current value, the application of the writing voltage pulse is stopped at that time. This makes it possible to color the pixel in a predetermined density.

[Decoloration Control]

In the case of decoloring a colored pixel, a positive voltage is impressed to cause an appropriate current to flow, whereby silver is dissolved and, as a result, the pixel becomes transparent. However, if the positive voltage is impressed excessively, not only decoloration occurs but also iodine is librated to cause coloration in yellow, in the case where silver iodide is used as a source of dissolved ions, for example. In order to achieve appropriate decoloration while preventing this phenomenon, the detection voltage pulse is impressed, the resulting current is detected, and decoloration is controlled, in the same manner as in the above-mentioned coloration control.

Figure 13:
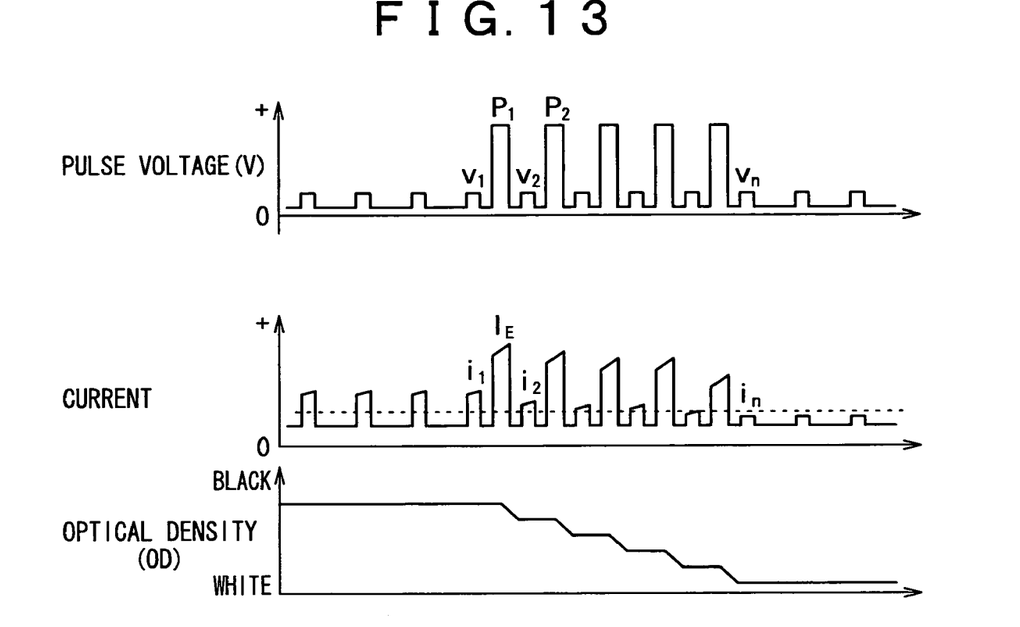
FIG. 13 is a waveform diagram showing one example of erasure control.

A specific example of this is shown in FIG. 13. FIG. 13 shows the pulse voltage impressed on the pixel, the current flowing due to the application of the pulse voltage, and the optical density (OD) of the pixel. In the current value, the line indicated by dot-dash line is a standard current value serving as a desired decoloration density level. This standard current value is also preset based on FIG. 11 above, but this is less than the standard current at the above-mentioned coloration (optical) density level.

When the detection voltage pulse $v_1$ of 0.1 volt and 10 ms is impressed on the colored pixel and the current $i_1$ (resistance) is measured, the current $i_1$ is in excess of the above-mentioned standard current value, so that it is detected that the pixel is in the colored state. In view of this, a positive erasing voltage pulse $P_1$ for erasure is impressed. The positive erasing voltage pulse $P_1$ is 1 V and 10 ms here. When the positive erasing voltage pulse $P_1$ is impressed, an erasing current $I_E$ flows, and silver is dissolved. After the application of the erasing voltage pulse $P_1$, a detection voltage pulse $v_2$ of 0.1 volt and 10 ms is again impressed, and the current $i_2$ (resistance) is measured. Although the density is lowered by one step, the density is insufficient as compared with the preset erased state, and the current $i_2$ also is in excess of the above-mentioned standard current value. In view of this, an erasing voltage pulse $P_2$ is again impressed. This cycle is repeated until the current $i_n$ upon application of the detection voltage pulse $v_n$ becomes less than the standard current value. When the current $i_n$ upon application of the detection voltage pulse $v_n$ is decreased to or below the standard current value, the application of the erasing voltage pulse is stopped. This makes it possible to sufficiently lower the pixel density to a predetermined density and to securely obtain an erased state.

[Fading Control]

In the display apparatus as above, by returning the voltage to zero or opening the circuit after coloration, the colored state can be maintained for a certain length of time (several tens of minutes at room temperature). However, silver is dissolved and the optical density is thereby lowered, with the lapse of time. In view of this, appropriate writing according to the deficient density is conducted, whereby the density is maintained for a long time.

Figure 14:
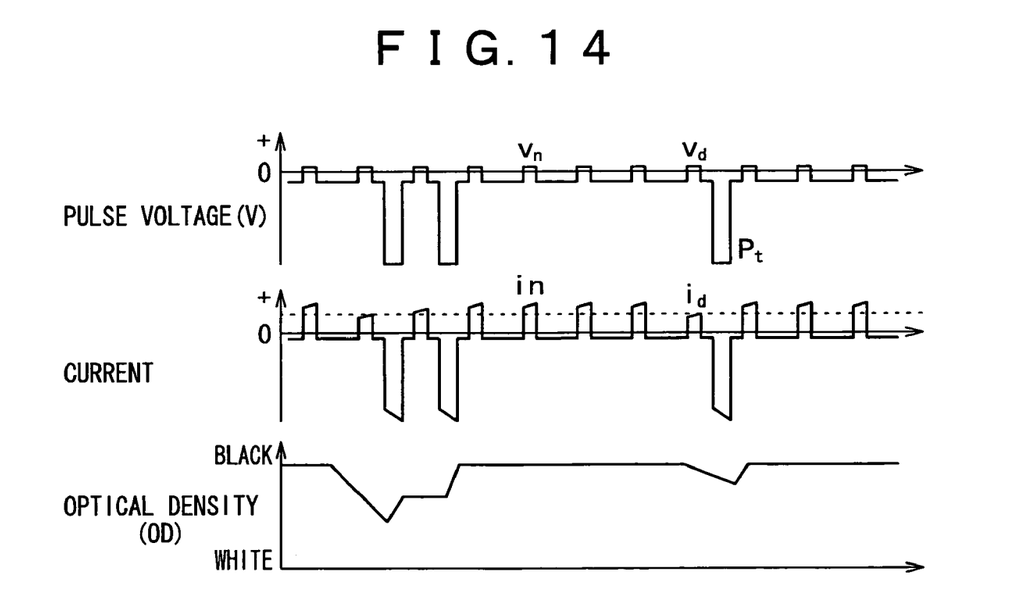
FIG. 14 is a waveform diagram showing one example of fading control.

A specific example of this is shown in FIG. 14. FIG. 14 shows the pulse voltage impressed on the pixel, the current flowing due to the application of the pulse voltage, and the optical density (OD) of the pixel. In the current value, the line indicated by dot-dash line is a standard current value serving as a desired optical density level, and is preset based on FIG. 11 above.

The writing is the same as in the above case of coloration control, and the application of the writing voltage pulse $P_n$ is repeated until the current $i_n$ upon application of the detection voltage pulse $v_n$ exceeds the standard current value. After the writing, also, the detection voltage pulse $v_n$ is impressed at a predetermined interval, and the optical density level is monitored through the current $i_n$. In this period, silver is dissolved with the lapse of time, the optical density level is gradually lowered, and the current $i_n$ is also gradually lowered. An additional writing pulse $P_t$ is impressed when the current $i_d$ upon application of the detection voltage pulse $v_d$ is decreased to or below the standard current value, as shown in the figure. When monitoring is conducted by periodically impressing the state detecting pulse after writing and the additional writing pulse is impressed as required, in this manner, the optical density level can be maintained for a long time.

[Rewriting Control]

Figure 15:
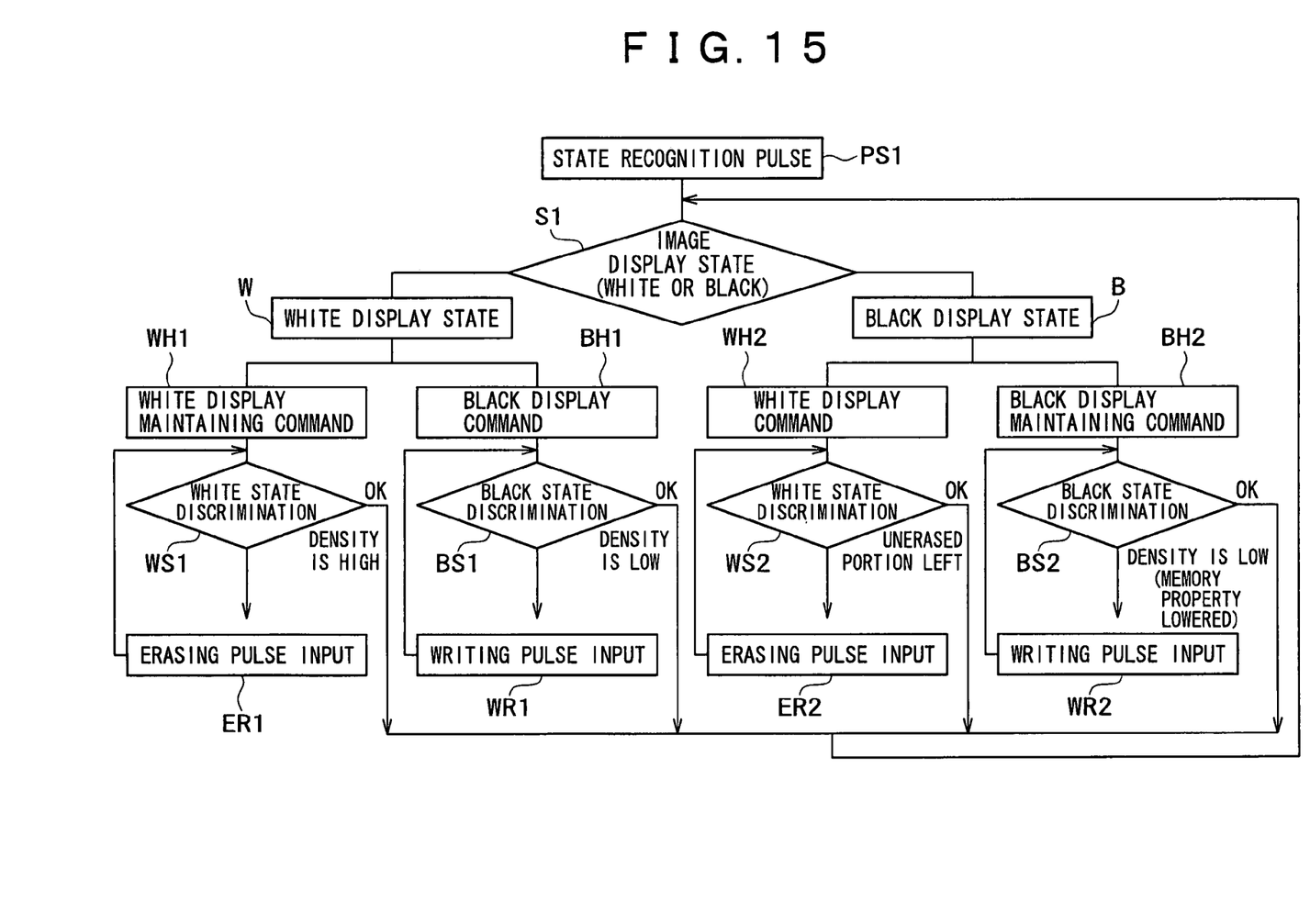
FIG. 15 is a flowchart of one example in which rewriting of a screen is controlled by monitoring the condition before writing.

In rewriting a black-white two-valued screen, rewriting to the next screen is conducted according to the condition of the current screen by the following technique. An example of monitoring the black/white condition before writing and controlling the rewriting of the screen is shown in FIG. 15.

First, a state recognition pulse PS1 is impressed on each pixel, and based on the resulting current, it is discriminated whether the display state of the pixel is white or black (S1). An AC or pulse voltage at a voltage (0.1 to 0.5 V) less than the coloration threshold is impressed as the state recognition pulse PS1, and the resulting current, i.e., the resistance is measured, whereby the colored state can be discriminated. For example, a smaller current (higher resistance) corresponds to white, and a larger current (lower resistance) corresponds to black.

As a result of the discrimination, in the pixel in the white display state W, when the next screen is also "white", the white display state is maintained by a white display maintaining command WH1. Incidentally, in this instance, white state discrimination WS1 is conducted in the same technique as in the above erasure control, and when the pixel density is higher, an erasing operation is conducted by an erasing pulse input ER1. On the other hand, in the pixel in the white display state W, when the next screen is "black", writing is conducted by a black display command BH1. At the time of writing, black state discrimination BS1 is conducted in the same technique as in the above coloration control, and when the optical density is deficient, the writing pulse input WR1 is repeated until a predetermined optical density is obtained.

As a result of the above discrimination, in the pixel in the black display state B, when the next screen is also "black", the black display state is maintained by a black display maintaining command BH2. In this instance, black state discrimination BS2 is conducted in the same technique as in the above coloration control, and when the optical density is deficient, writing pulse input WR2 is repeated until a predetermined optical density is obtained. Where the next screen is "white", white display, or erasure, is conducted by a white display command WH2. In this instance, white state discrimination WS2 is conducted by the same technique as in the above erasure control, and when an unerased portion is left, an erasing operation is conducted by use of an erasing pulse input ER2 until a predetermined white level is obtained.

[Gradation Control]

Figure 16:
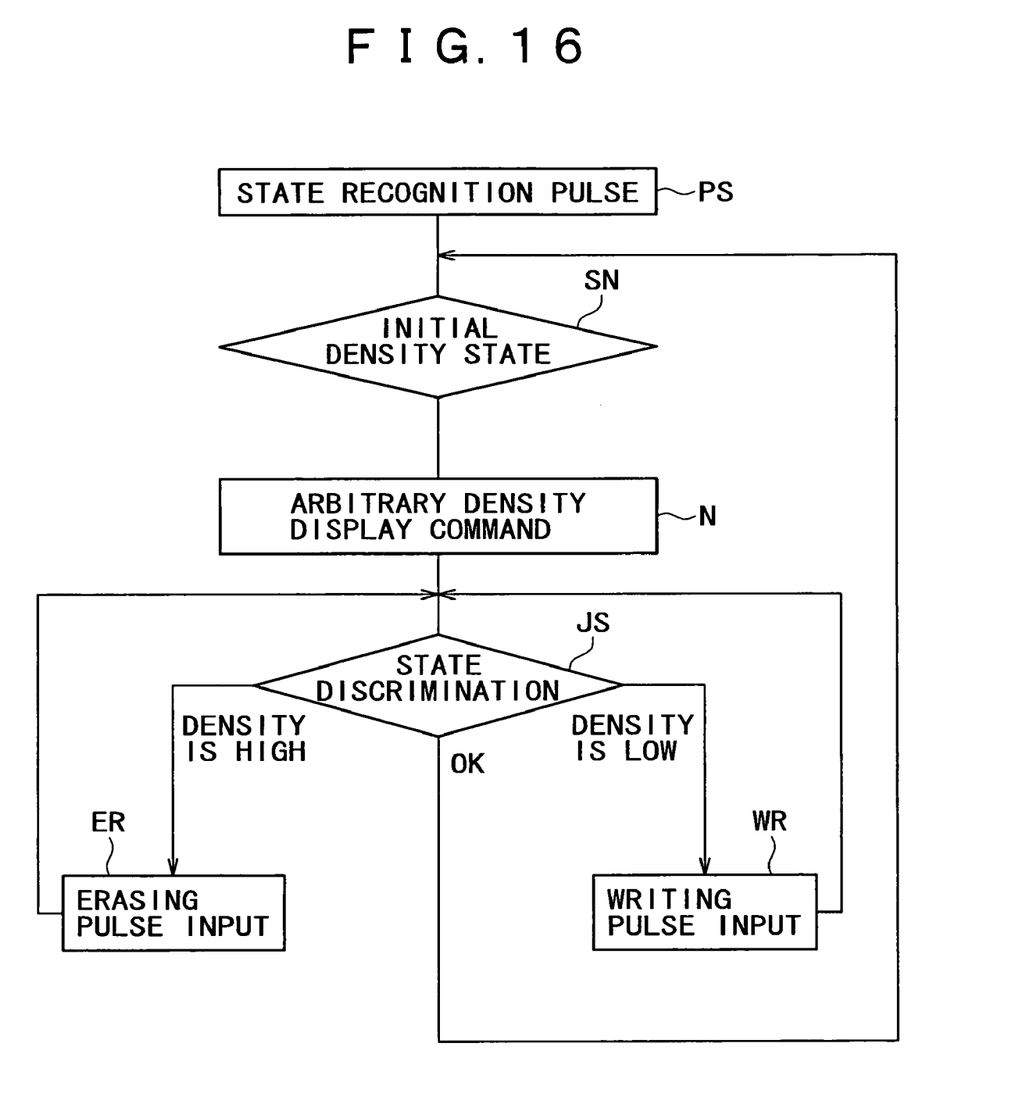
FIG. 16 is a flowchart of one example in which gradation control is performed by monitoring the condition before writing.

Gradation control can be realized by applying the above-mentioned coloration control. An example of monitoring the density before writing and then controlling to a predetermined density is shown in FIG. 16.

In the case of performing gradation control, first, a state recognition pulse PS is impressed on the pixel, and the initial density state is grasped (SN). The initial density state can be discriminated by impressing an AC or pulse voltage at a voltage (0.1 to 0.5 V) less than the coloration threshold and measuring the resulting current, or resistance, in the same manner as in the above case of coloration control or erasure control.

Next, the density of each pixel is brought to a predetermined gradation density by an arbitrary density display command N. In this case, it suffices to set each gradation density and the relevant resistance value (current value) in correspondence with each other, and to perform density control based on this. The density control is conducted while monitoring the colored state of the pixels by state discrimination JS, in the same manner as in the case of coloration control or erasure control. The state discrimination JS is conducted based on the current value according to each gradation density, and the individual pixels are set to predetermined gradation densities. Based on the results of the state discrimination JS, the density is lowered by erasing pulse input ER when the density is high, and the density is raised by writing pulse input WR when the density is low.

As is clear from the above description, according to the present invention, it is possible to quantitatively control the optical density (coloration density) and to control the colored state of each pixel to an appropriate state, for example, a uniform state. Besides, by the quantitative control, display of gradations can also be realized.

Further, according to the present invention, the optical density can be quantitatively controlled even in the erasing operation, so that the erasing and writing times can be shortened and the power consumption can be minimized, as compared with a method in which coloration is conducted after complete erasure. Particularly in the case of black-white two-valued display or gradation display based on gray scale, rewriting of the screen can be performed with minimum power consumption. Furthermore, according to the present invention, the phenomenon in which the optical density is lowered with the lapse of time can be accurately compensated for, and the attendant power consumption can be minimized.

The invention claimed is:

1. A method of driving a plurality of pixels constituting a multi-gradation electro-deposition display apparatus by selectively causing deposition and/or dissolution of a metal contained in a layer between two electrodes by impressing a predetermined voltage between the electrodes of each pixel, said method comprising:

for each of a plurality of pixels, applying a voltage pulse or alternating current voltage having an amplitude of not more than a threshold to the pixel and determining a resulting current and/or resistance based upon the applied voltage pulse or alternating current voltage to the pixel, and selectively applying a writing pulse or an erasing pulse based on the current and/or resistance depending upon a desired coloration state for the pixel, and further wherein by applying said writing pulse or erasing pulse, the density of each said pixel is controlled, thereby causing the gradation of said pixel to shift to a whiter or a blacker level of the multi-gradation display, wherein at least some of the pixels receive a writing pulse and at least some of the pixels receive an erasing pulse in order to display information.

2. The method of driving a display apparatus as set forth in claim 1, wherein said display apparatus has a structure in which said two electrodes are disposed opposite one another on opposing sides of an electrolyte layer containing metal ions, a writing pulse is passed between said opposed electrodes to thereby deposit the metal on one of said electrodes as a coloring material, and said pixel where said metal is deposited is recognized as a colored state.

3. The method of driving a display apparatus as set forth in claim 2, wherein said coloring material is at least one selected from the group consisting of bismuth, copper, silver, lithium, iron, chromium, nickel, and cadmium.

4. The method of driving a display apparatus as set forth in claim 2, wherein said electrolyte layer is a polymer electrolyte layer.

5. A method of driving a plurality of pixels constituting a multi-gradation electro-deposition display apparatus by selectively causing deposition and/or dissolution of a metal contained in a layer between two electrodes by impressing a predetermined voltage between the electrodes of each pixel, said method comprising:

after writing is conducted such that metal is deposited on one of the electrodes, a voltage pulse or alternating current voltage having an amplitude of not more than a threshold for deposition of said metal is periodically impressed at each pixel in order to determine if the particular gradation level is being maintained, and, selectively applying a writing pulse or an erasing pulse based on a current and/or resistance associated with the pixel depending upon a desired coloration state for the pixel, and further wherein by applying said writing pulse or erasing pulse, the density of each said pixel is controlled, thereby causing the gradation of said pixel to shift to a whiter or a blacker level of the multi- gradation display, wherein at least some of the pixels receive a writing pulse and at least some of the pixels receive an erasing pulse in order to display information.

6. A method of driving a plurality of pixels constituting a multi-gradation electro-deposition display apparatus by selectively causing deposition and/or dissolution of a metal contained in a layer between two electrodes by impressing a predetermined voltage between the electrodes of each pixel, said method comprising:

applying a voltage pulse or alternating current voltage having an amplitude of not more than a threshold to each pixel and determining a resulting current and/or resistance, and selectively applying a writing pulse or an erasing pulse based on the current and/or resistance depending upon a desired coloration state for the pixel, and further wherein by applying said writing pulse or erasing pulse, the density of each said pixel is controlled, thereby causing the gradation of said pixel to shift to a whiter or a blacker level of the multi-gradation display, wherein at least some of the pixels receiving a writing pulse and at least some of the pixels receiving an erasing pulse in order to display information.

7. The method of driving a display apparatus as set forth in claim 1, wherein said layer between the two electrodes contains said metal as metal ions mixed into a polymer electrolyte.

8. The method of driving a display apparatus as set forth in claim 5, wherein said layer between the two electrodes contains said metal as metal ions mixed into a polymer electrolyte.

9. The method of driving a display apparatus as set forth in claim 6, wherein said layer between the two electrodes contains said metal as metal ions mixed into a polymer electrolyte.

10. A method of driving a plurality of pixels constituting a multi-gradation electro-deposition display apparatus by selectively causing deposition and/or dissolution of a metal contained in a layer between two electrodes by impressing a predetermined voltage between the electrodes of each pixel, said method comprising:

applying a voltage pulse or alternating current voltage having an amplitude of not more than a threshold to each pixel and measuring the resulting current and/or resistance and determining, based on said measurement, if each pixel is at a desired gradation level, for those pixels that are not at a desired gradation level, selectively applying a writing pulse or an erasing pulse to each pixel based on the current and/or resistance associated with the pixel depending upon a desired coloration state for the pixel, and further wherein by applying said writing pulse or erasing pulse, the density of each said pixel is controlled, thereby causing the gradation of said pixel to shift to a whiter or a blacker level of the multi-gradation display, wherein at least some of the pixels receiving a writing pulse and at least some of the pixels receiving an erasing pulse in order to display information.

11. The method of driving a display apparatus as set forth in claim 10, wherein a plurality of writing or erasing pulses are applied to a single pixel in order to change the gradation of the single pixel more than one step.

12. The method of driving a display apparatus as set forth in claim 10, wherein for those pixels that are already at a desired gradation level, no writing or erasing pulse is applied.

13. The method of driving a display apparatus as set forth in claim 1, wherein said writing pulse has a negative polarity, and said erasing pulse has a positive polarity.

14. The method of driving a display apparatus as set forth in claim 5, wherein said writing pulse has a negative polarity, and said erasing pulse has a positive polarity.

15. The method of driving a display apparatus as set forth in claim 6, wherein said writing pulse has a negative polarity, and said erasing pulse has a positive polarity.

16. The method of driving a display apparatus as set forth in claim 10, wherein said writing pulse has a negative polarity, and said erasing pulse has a positive polarity.

17. The method of driving a display apparatus as set forth in claim 1, wherein the first step and the second step are repeated a plurality of times in one display cycle for a particular pixel until a desired gradation level is reached for the particular pixel.

18. The method of driving a display apparatus as set forth in claim 5, wherein the first step and the second step are repeated a plurality of times in one display cycle for a particular pixel until a desired gradation level is reached for the particular pixel.

19. The method of driving a display apparatus as set forth in claim 6, wherein the first step and the second step are repeated a plurality of times in one display cycle for a particular pixel until a desired gradation level is reached for the particular pixel.

20. The method of driving a display apparatus as set forth in claim 10, wherein the first step and the second step are repeated a plurality of times in one display cycle for a particular pixel until a desired gradation level is reached for the particular pixel.

* * * * *